United States Patent
Hotta et al.

(10) Patent No.: US 8,203,926 B2
(45) Date of Patent: Jun. 19, 2012

(54) OPTICAL PICKUP APPARATUS

(75) Inventors: Tohru Hotta, Okaya (JP); Ryoichi Kawasaki, Isesaki (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

(21) Appl. No.: 12/940,226

(22) Filed: Nov. 5, 2010

(65) Prior Publication Data

US 2011/0110215 A1    May 12, 2011

(30) Foreign Application Priority Data

Nov. 9, 2009    (JP) .................. 2009-255695

(51) Int. Cl.
*G11B 7/00* (2006.01)
(52) U.S. Cl. ............... 369/112.08; 369/112.25
(58) Field of Classification Search .......... 369/112.23, 369/112.25, 112.08, 112.13, 44.23, 94
See application file for complete search history.

(56) References Cited

U.S. PATENT DOCUMENTS

| | | | | |
|---|---|---|---|---|
| 2006/0146422 A1* | 7/2006 | Koike | ............... | 359/742 |
| 2008/0013412 A1* | 1/2008 | Nomura et al. | ............... | 369/44.11 |
| 2009/0016194 A1* | 1/2009 | Koreeda et al. | ............... | 369/112.23 |
| 2009/0097380 A1* | 4/2009 | Mizuno | ............... | 369/112.03 |
| 2009/0097381 A1* | 4/2009 | Hamano et al. | ............... | 369/112.23 |
| 2010/0157777 A1* | 6/2010 | Mizuno | ............... | 369/112.05 |

FOREIGN PATENT DOCUMENTS

| | | |
|---|---|---|
| JP | 2004-014042 | 1/2004 |
| JP | 2006-236414 | 9/2006 |

* cited by examiner

*Primary Examiner* — Thang Tran
(74) *Attorney, Agent, or Firm* — SoCal IP Law Group LLP; Steven C. Sereboff; John E. Gunther

(57) ABSTRACT

An optical pickup apparatus comprises: a first laser diode that generates a first laser beam having a first wavelength; a second laser diode that generates a second laser beam having a second wavelength longer than the wavelength; a third laser diode that generates a third laser beam having a third wavelength longer than the first wavelength and shorter than the second wavelength; an objective lens having an inner, outer, intermediate regions on an incident surface, the first laser beam being condensed on a signal recording layer of a first optical disc by condensing actions of the inner and outer regions, the second laser beam being condensed on a signal recording layer of a second optical disc by condensing actions of the inner and intermediate regions, the third laser beam being condensed on a signal recording layer of a third optical disc by condensing actions of the inner and intermediate regions.

4 Claims, 5 Drawing Sheets

OPTICAL PICKUP APPARATUS

CROSS-REFERENCE TO RELATED APPLICATION

This application claims the benefit of priority to Japanese Patent Application No. 2009-255695, filed Nov. 9, 2009, of which full contents are incorporated herein by reference.

BACKGROUND OF THE INVENTION

1. Field of the Invention

The present invention relates to an optical pickup apparatus using a laser beam to perform an action of reading out signals recorded on an optical disc and an action of recording signals onto the optical disc.

2. Description of the Related Art

An optical disc apparatus has become widespread that is capable of performing actions of reading out signals and recording signals by irradiating a laser beam emitted from an optical pickup apparatus onto a signal recording layer of an optical disc.

Although a generally widespread optical disc apparatus is of a type using an optical disc called a CD or a DVD, there has been recently developed a type using an optical disc with an improved recording density, i.e., a Blu-ray standard optical disc.

An infrared beam with a wavelength of 785 nm is used as a laser beam for performing an action of reading out signals recorded on a CD standard optical disc, while a red beam with a wavelength of 655 nm is used as a laser beam for performing an action of reading out signals recorded on a DVD standard optical disc.

The thickness of a transparent protective layer provided between a signal recording layer included in the CD standard optical disc and a surface of the optical disc is 1.2 mm, and the numerical aperture of an objective lens used to perform the action of reading out signals from the signal recording layer is set to 0.47. The thickness of a transparent protective layer provided between a signal recording layer included in the DVD standard optical disc and a surface of the optical disc is 0.6 mm, and the numerical aperture of an objective lens used to perform the action of reading out signals from the signal recording layer is set to 0.6.

A laser beam with a short wavelength, e.g. a blue-violet beam with a wavelength of 405 nm is used as a laser beam for performing an action of reading out signals recorded on the Blu-ray standard optical disc, in respect to the CD standard and DVD standard optical discs.

The thickness of a protective layer provided on an upper surface of a signal recording layer included in the Blu-ray standard optical disc is 0.1 mm, and the numerical aperture of an objective lens used to perform the action of reading out signals from this signal recording layer is set to 0.85.

It is required to reduce the diameter of a laser spot generated by condensing a laser beam in order to perform the action of reading out signals recorded on the signal recording layer included in the Blu-ray standard optical disc and the action of recording signals onto the signal recording layer. The objective lens used to obtain a desired laser spot shape is characterized in that its radius of curvature becomes small because not only does its numerical aperture increase but also its focal length decreases.

Although there is commercially provided an optical disc apparatus capable of performing actions of reading out signals recorded on all optical discs of the above-described CD standard, DVD standard, and the Blu-ray standard and actions of recording signals thereonto, an optical pickup apparatus assembled in such an optical disc apparatus incorporates a laser diode that emits laser beams having wavelengths corresponding to each of the above standards and an objective lens configured to condense laser beams emitted from the laser diode onto a signal recording layer included in each optical disc.

The optical pickup apparatus capable of performing the actions of reading out signals recorded on the optical discs of all the different standards described above incorporates two objective lenses, one for performing an action of condensing a laser beam applied to the optical discs of the CD standard and the DVD standard, and the other for performing an action of condensing a laser beam applied to the optical disc of the Blu-ray standard.

The optical pickup apparatus incorporating the two objective lenses poses not only a problem of an optical system configuration becoming complicated but also a problem of the shape of the optical pickup apparatus becoming large. As a method for solving the problems, a technique has been developed that enables a single objective lens to condense laser beams onto the optical discs of all standards.

The optical pickup apparatus involves a problem that it cannot perform normal actions of reading out and recording signals as a result of occurrence of a spherical aberration attributable to the thickness of the protective layer interposed between a disc surface that is a laser beam incident surface of the optical disc and the signal recording layer thereof. As a method for solving such a problem, a technique has been developed to correct the spherical aberration by displacing a collimating lens provided between the laser diode and the objective lens along its optical axis direction (refer to Japanese Patent Application Laid-Open Publication Nos. 2006-236414 and 2004-14042).

Although the optical pickup apparatus described in Japanese Patent Application Laid-Open Publication No. 2006-236414 is configured to use a single objective lens to perform the actions of reading out signals recorded on the three types of optical discs of different standards, the actions of selecting the laser beams and setting the numerical aperture of the objective lens are carried out by a diffraction optical element disposed at the incident surface side of the objective lens, so that the number of optical system components increases. As a result, there arises a problem that the assembling and adjusting actions cannot easily be performed.

Another problem also arises of a shortage in the quantity of light of the laser beam used for the action of reading out signals recorded on a first optical disc, due to such a configuration that laser beams incident on the outer circumference side of the objective lens are used to read out signals recorded on the first optical disc and that laser beams incident on the inner circumference side thereof are used to read out signals recorded on a second optical disc and a third optical disc.

SUMMARY OF THE INVENTION

An optical pickup apparatus according to an aspect of the present invention configured to read out a signal recorded on a signal recording layer of each of a first optical disc, a second optical disc, and a third optical disc, the first optical disc including a signal recording layer at a first distance from a surface thereof, the second optical disc including a signal recording layer at a second distance longer than the first distance from a surface thereof, the third optical disc including a signal recording layer at a third distance longer than the first distance and shorter than the second distance from a surface thereof, the optical pickup apparatus comprises: a first laser diode configured to generate a first laser beam having a first wavelength suitable for reading out a signal recorded on the signal recording layer of the first optical disc; a second laser diode configured to generate a second laser beam having a second wavelength suitable for reading out a signal recorded on the signal recording layer of the second optical disc, the second wavelength being longer than the first wavelength; a third laser diode configured to generate a third laser beam having a third wavelength suitable for reading out a signal recorded on the signal recording layer of the third optical disc, the third wavelength being longer than the first wavelength and shorter than the second wavelength; and an objective lens configured to condense the first to third laser beams on the signal recording layers of the first to third optical discs, respectively, an incident surface of the objective lens, on which each of the first to third laser beams is allowed to enter, having an inner region covering a center of the incident surface, an outer region, and an intermediate region between the inner and outer regions, the first laser beam being condensed on the signal recording layer of the first optical disc by condensing actions of the inner region and the outer region, the second laser beam being condensed on the signal recording layer of the second optical disc by condensing actions of the inner region and the intermediate region, and the third laser beam being condensed on the signal recording layer of the third optical disc by condensing actions of the inner region and the intermediate region.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
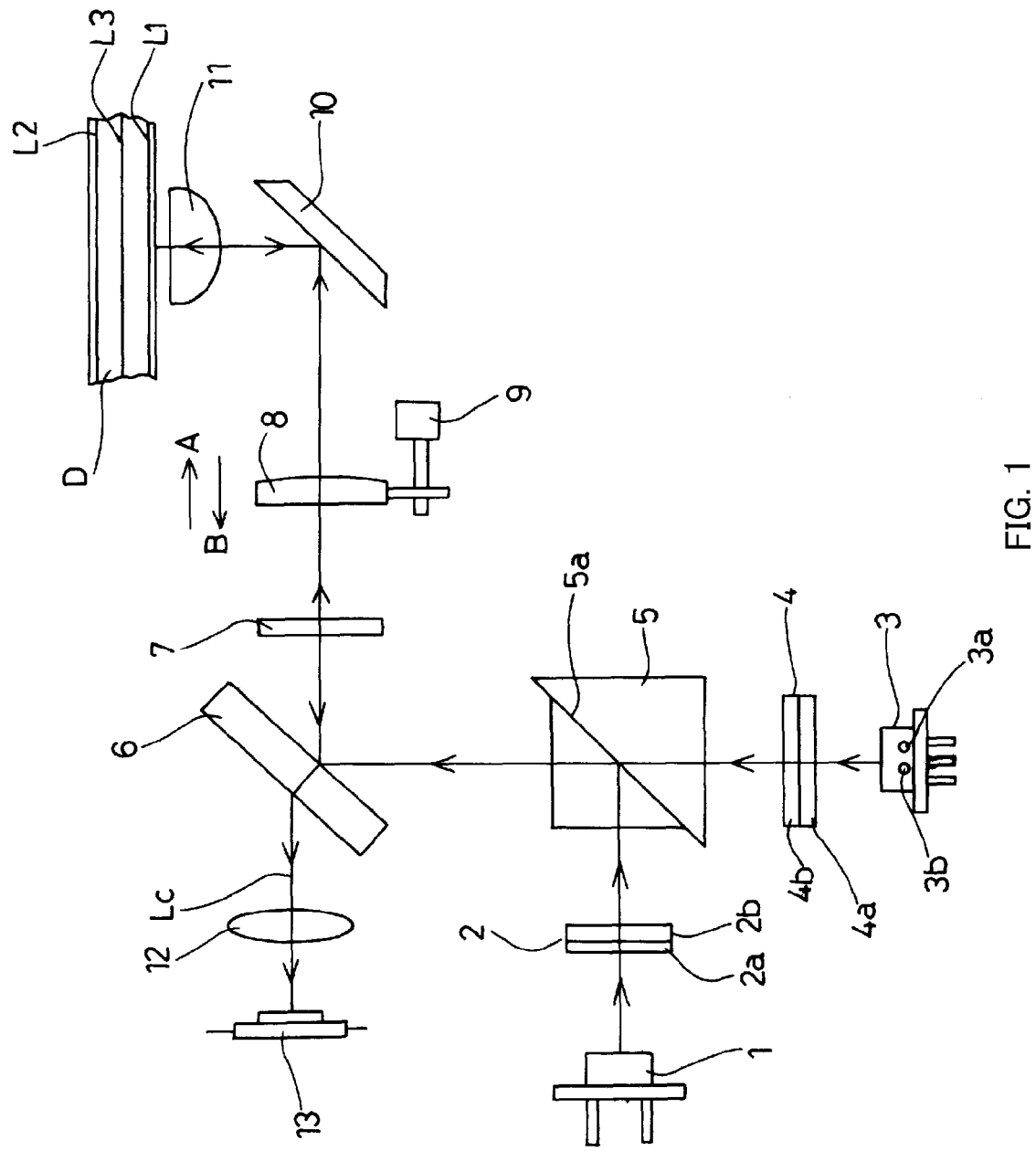
FIG. 1 is a schematic diagram showing an optical pickup apparatus according to an embodiment of the present invention.

At least the following details will become apparent from descriptions of this specification and of the accompanying drawings.

An optical pickup apparatus according to an embodiment of the present invention includes a first laser diode that generates a first laser beam having a wavelength suitable for performing an action of reading out a signal recorded on a signal recording layer of a first optical disc; a second laser diode that generates a second laser beam having a wavelength suitable for performing an action of reading out a signal recorded on a signal recording layer of a second optical disc, the wavelength being longer than that of the first laser beam; a third laser diode that generates a third laser beam having a wavelength suitable for performing an action of reading out a signal recorded on a signal recording layer of a third optical disc, the wavelength being longer than that of the first laser beam and shorter than that of the second laser beam; and an objective lens having three regions of an inner region, an intermediate region, and an outer region. The first laser beam emitted from the first laser diode is condensed on the signal recording layer included in the first optical disc by condensing actions of the inner region and the outer region formed on the objective lens; the second laser beam emitted from the second laser diode is condensed on the signal recording layer included in the second optical disc by condensing actions of the intermediate region and the inner region formed on the objective lens; and the third laser beam emitted from the third laser diode is condensed on the signal recording layer included in the third optical disc by the condensing actions of the intermediate region and the inner region formed on the objective lens.

In the optical pickup apparatus of this embodiment, the intermediate region is formed with a diffraction zone, and by the diffraction zone the first laser beam incident on the intermediate region is prevented from condensing on the signal recording layer included in the first optical disc.

In the optical pickup apparatus of this embodiment, the diffraction zone is formed to condense the second laser beam on the signal recording layer included in the second optical disc and condense the third laser beam on the signal recording layer included in the third optical disc.

In the optical pickup apparatus of this embodiment, a spherical surface of the objective lens is formed from an aspherical surface that condenses the first laser beam on the signal recording layer included in the first optical disc.

In the optical pickup apparatus of this embodiment, the second laser diode and third laser diode are formed from a two-wavelength laser diode having a casing that incorporates laser chips emitting laser beams of two different wavelengths.

Further, in the optical pickup apparatus of this embodiment, a collimating lens is disposed in optical paths between the objective lens and each of the first laser diode emitting the first laser beam, the second laser diode emitting the second laser beam, and the third laser diode emitting the third laser beam, and a spherical aberration is corrected by a displacement action of the collimating lens in an optical axis direction.

The optical pickup apparatus of this embodiment is configured such that, not only are laser beams emitted from the three laser diodes made to enter a single objective lens and, by the action of the diffraction zone formed on the objective lens, condense on the signal recording layers included in the optical discs of the three different standards, but also laser beams passing through the inner region of the objective lens are used for the actions of reading out signals recorded on all types of the optical discs, therefore enabling an effective use of the laser beams and acquiring the quantity of light required for the actions of reading out signals from all types of the optical discs.

By virtue of the configuration in which laser beams emitted from the three laser diodes are irradiated on the single objective lens and, by the action of the diffraction zone formed on the objective lens, a condensing action is performed on the signal recording layers included in the optical discs of the three different standards, the cost of the optical pickup apparatus can be reduced.

In FIG. 1, reference numeral 1 denotes a first laser diode that emits a first laser beam in the form of a blue-violet beam having a wavelength of 405 nm for example, and reference numeral 2 denotes a first diffraction grating on which the first laser beam emitted from the first laser diode 1 enters. The first diffraction grating 2 is configured by a diffraction grating portion 2a that separates the laser beam into a zeroth-order beam as a main beam and into a plus-first-order beam and a minus-first-order beam as two sub-beams, and a ½ wave plate 2b that converts the incoming laser beam into a linearly polarized light beam in an S-direction.

Reference numeral 3 denotes a two-wavelength laser diode having a casing incorporating therein a laser chip 3a acting as a second laser diode emitting a second laser beam that is an infrared beam with a wavelength of 785 nm for example, and a laser chip 3b acting as a third laser diode emitting a third laser beam that is a red beam with a wavelength of 655 nm for example.

Reference numeral 4 denotes a second diffraction grating on which the second laser beam and the third laser beam emitted from the two-wavelength laser diode 3 enter. The second diffraction grating 4 is configured by a diffraction grating portion 4a that separates the laser beams into a zeroth-order beam as a main beam and into a plus-first-order beam and a minus-first-order beam as two sub-beams, and a ½ wave plate 4b that converts the incoming laser beams into linearly polarized light beams in a P-direction.

Reference numeral 5 denotes a polarized light beam splitter provided at a position on which the first laser beam that has passed through the first diffraction grating 2 and the second laser beam and the third laser beam that have passed through the second diffraction grating 4 enter. The polarized light beam splitter 5 includes a control film 5a that reflects the laser beam made into the S-polarized light beam by the ½ wave plate 2b and that transmits the laser beams made into the polarized light beams in the P-direction by the ½ wave plate 4b.

Reference numeral 6 denotes a half mirror that reflects the S-polarized light beam of the first laser beam reflected by the polarized light beam splitter 5 and transmits a P-polarized light beam thereof and that reflects the P-polarized light beam of the second laser beam and the third laser beam that have passed through the polarized light beam splitter 5 and transmits an S-polarized light beam thereof.

Reference numeral 7 denotes a ¼ wave plate provided at a position on which the laser beams reflected by the half mirror 6 enter. The ¼ wave plate 7 serves to perform the conversion of the incident laser beam from a linearly polarized light beam into a circularly polarized light beam, or in reverse, from a circularly polarized light beam into a linearly polarized light beam. Reference numeral 8 denotes a collimating lens that receives the laser beam passing through the ¼ wave plate 7 and that converts the incident laser beam into a parallel beam. The collimating lens 8 is configured to be displaced by an aberration correcting motor 9 in an optical axis direction, i.e. toward the directions indicated by arrows A and B. The configuration is such that the spherical aberration attributable to the thickness of the protective layer of the optical disc D is corrected by the displacement action of the collimating lens 8 in an optical axis direction.

Reference numeral 10 denotes a rising mirror provided at a position on which the laser beam that has passed through the collimating lens 8 enters. The rising mirror 10 is configured to reflect the incident laser beam in a direction toward an objective lens 11.

D denotes an optical disc; L1 denotes a position of the signal recording layer included in a first optical disc D1 having a short distance from the optical disc surface to the signal recording layer; L2 denotes a position of the signal recording layer included in a second optical disc D2 having a long distance from the optical disc surface to the signal recording layer; and L3 denotes a location of the signal recording layer included in a third optical disc D3 having a distance from the optical disc surface to the signal recording layer longer than that of the first optical disc D1 and shorter than that of the second optical disc D2.

In such a configuration, the first laser beam emitted from the first laser diode 1 enters the objective lens 11 by way of the first diffraction grating 2, the polarized light beam splitter 5, the half mirror 6, the ¼ wave plate 7, the collimating lens 8, and the rising mirror 10, and thereafter, is irradiated as a condensed spot to the signal recording layer L1 included in the first optical disc D1 by the condensing action of the objective lens 11. The first laser beam irradiated to the signal recording layer L1 is reflected as a return beam by the signal recording layer L1.

The second laser beam emitted from the two-wavelength laser diode 3 enters the objective lens 11 by way of the second diffraction grating 4, the polarized light beam splitter 5, the half mirror 6, the ¼ wave plate 7, the collimating lens 8, and the rising mirror 10, and thereafter, is irradiated as a condensed spot to the signal recording layer L2 included in the second optical disc D2 by the condensing action of the objective lens 11. The second laser beam irradiated to the signal recording layer L2 is reflected as a return beam by the signal recording layer L2.

The third laser beam emitted from the two-wavelength laser diode 3 enters the objective lens 11 by way of the second diffraction grating 4, the polarized light beam splitter 5, the half mirror 6, the ¼ wave plate 7, the collimating lens 8, and the rising mirror 10, and thereafter, is irradiated as a condensed spot to the signal recording layer L3 included in the third optical disc D3 by the condensing action of the objective lens 11. The third laser beam irradiated to the signal recording layer L3 is reflected as a return beam by the signal recording layer L3.

The return beams reflected from the signal recording layers L1, L2, and L3 included in each of the optical discs D1, D2, and D3 enter the half mirror 6 through the objective lens 11, the rising mirror 10, the collimating lens 8, and the ¼ wave plate 7. Of the return beams entering the half mirror 6 in this manner, the first laser beam is changed into a linearly polarized light beam in the P-direction and the second and the third laser beams are changed into linearly polarized light beams in the S-direction by the phase changing action of the ¼ wave plate 7. Therefore, the return beams of the first laser beam, the second laser beam, and the third laser beam are to pass through the half mirror 6 as control laser beams Lc, without being reflected by the half mirror 6.

Reference numeral 12 denotes a sensor lens on which enters the control laser beam Lc that has passed through the half mirror 6. The sensor lens 12 serves to irradiate the control laser beam Lc with astigmatism to a beam-receiving portion disposed on a photodetector 13 called a PDIC. The photodetector 13 is provided with a well-known 4-split sensor and the like, and the photodetector 13 is configured to perform, by a main beam irradiating action, both a signal generating action attendant on an action of reading out signals recorded on the signal recording layer of the optical disc D, and a focus error signal generating action for performing a focusing control action based on an astigmatism method, and, by two-sub-beams irradiating actions, a tracking error signal generating action for performing a tracking control action.

The optical pickup apparatus of this embodiment is thus configured as described above. In such a configuration, the objective lens 11 is fixed to a lens holding frame (not shown) that is supported on a base of the optical pickup apparatus by four or six supporting wires in such a manner as to allow a displacement action in a direction perpendicular to a signal surface of the optical disc D, i.e., in a focusing direction, and a displacement action in a radial direction of the optical disc D, i.e., in a tracking direction.

The above-described displacement actions of the objective lens 11 in the focusing direction and in the tracking direction are performed by feeding a drive signal to a focusing coil and a tracking coil disposed on the lens holding frame.

The optical pickup apparatus of this embodiment is configured as described hereinabove. Description will be made of the actions of the thus configured optical pickup apparatus for each of the optical discs.

In the case of performing the action of reading out signals recorded on the signal recording layer L1 included in the first optical disc D1, a drive current is fed to the first laser diode 1, and the first laser diode 1 emits a first laser beam having a wavelength of 405 nm. The first laser beam emitted from the first laser diode 1 enters the first diffraction grating 2, and is separated by the diffraction grating portion 2a making up the first diffraction grating 2 into a zeroth-order beam, a plus-first-order beam, and a minus-first-order beam, and thereafter is converted by the ½ wave plate 2b into a linearly polarized light beam in an S-direction. The first laser beam that has passed through the first diffraction grating 2 enters the polarized light beam splitter 5 and is reflected by the control film 5a disposed in the polarized light beam splitter 5.

The first laser beam reflected by the control film 5a enters the half mirror 6. Since such a laser beam is an S-polarized light beam, it is reflected by the half mirror 6 toward the ¼ wave plate 7. The first laser beam incident on the ¼ wave plate 7 is converted into a circularly polarized light beam and thereafter enters the collimating lens 8 and is converted into a parallel beam by the action of the collimating lens 8. The laser beam converted into the parallel beam by the collimating lens 8 is reflected by the reflection mirror 10 and thereafter enters the objective lens 11. The laser beam incident on the objective lens 11 is irradiated as a condensed spot onto the signal recording layer L1 of the first optical disc D1 by the condensing action of the objective lens 11.

When the above described first laser beam condensing action is performed by the objective lens 11, there occurs a spherical aberration due to the difference in the thickness of the protective layer lying between the signal recording layer L1 and the surface that is a signal incident surface of the optical disc. It is possible, however, to make an adjustment so as to minimize this spherical aberration by displacing the collimating lens 8 along its optical axis direction as depicted in this embodiment. Such an adjustment action made by the displacement of the collimating lens 8 is performed by rotationally driving the aberration correcting motor 9.

By the above actions, the condensing action of the first laser beam onto the signal recording layer L1 included in the first optical disc D1 is performed. When such a condensing action is performed, a return beam reflected from the signal recording layer L1 enters the objective lens 11 from its first optical disc D1 side. The return beam incident on the objective lens 11 passes through the reflection mirror 10, the collimating lens 8, and the ¼ wave plate 7 into the half mirror 6. Since the return beam incident on the half mirror 6 is already converted into the linearly polarized light beam in the P-direction by the ¼ wave plate 7, the return beam is allowed to pass through the half mirror 6.

The return laser beam passing through the half mirror 6 enters as the control laser beam Lc into the sensor lens 12, and astigmatism is caused in the beam by the action of the sensor lens 12. The control laser beam Lc having astigmatism caused by the sensor lens 12 is irradiated by the condensing action of the sensor lens 12 to a sensor portion such as the 4-split sensor disposed on the photodetector 13. As a result of the return beam being irradiated to the photodetector 13 in this manner, the action of generating the focus error signal is carried out as is well known by utilizing a change in the shape of a spot applied to the sensor portion assembled in the photodetector 13. The focusing control action can be performed by utilizing the focus error signal and displacing the objective lens 11 toward the signal surface of the first optical disc D1.

Although not described in this embodiment, the configuration is such that a well-known tracking control action can be performed utilizing the plus-first-order beam and the minus-first-order beam generated by the first diffraction grating 2. By performing such a control action, the action of reading out signals recorded on the first optical disc D1 is performed.

Since it can be recognized whether the condensed spot formed on the signal recording layer L1 of the first optical disc D1 by the condensing action of the objective lens 11 is good or defective by detecting the magnitude of the level of a reproduction signal obtained from the photodetector 13, the aberration correcting motor 9 is rotationally driven based on this recognition signal to adjust the position of the collimating lens 8 in its optical direction, thereby enabling a correction of the spherical aberration.

The read-out action of signals recorded on the first optical disc D1 by the optical pickup apparatus is carried out as described hereinabove. Description will then be made of an action of reading out signals recorded on the second optical disc D2.

In the case of performing the action of reading out signals recorded on the second optical disc D2, a drive current is fed to the laser chip 3a assembled in the two-wavelength laser diode 3, and the two-wavelength laser diode 3 emits a second laser beam having a wavelength of 785 nm. The second laser beam emitted from the two-wavelength laser diode 3 enters the second diffraction grating 4, and is separated by the diffraction grating portion 4a making up the second diffraction grating 4 into a zeroth-order beam, a plus-first-order beam, and a minus-first-order beam, and thereafter is converted by the ½ wave plate 4b into a linearly polarized light beam in the P-direction. The second laser beam passing through the second diffraction grating 4 enters the polarized light beam splitter 5 and passes through the control film 5a disposed in the polarized light beam splitter 5.

The second laser beam passing through the control film 5a enters the half mirror 6. Since such a second laser beam is a P-polarized light beam, it is reflected by the half mirror 6 toward the ¼ wave plate 7. The second laser beam incident on the ¼ wave plate 7 is converted into a circularly polarized light beam, thereafter enters the collimating lens 8, and is converted into a parallel beam by the action of the collimating lens 8. The laser beam converted into the parallel beam by the collimating lens 8 is reflected by the reflection mirror 10 and thereafter enters the objective lens 11. The laser beam incident on the objective lens 11 is to be irradiated as a condensed spot onto the signal recording layer L2 of the second optical disc D2 by the condensing action of the objective lens 11.

When the above described second laser beam condensing action is performed by the objective lens 11, there occurs a spherical aberration due to the difference in the thickness of the protective layer lying between the signal recording layer L2 and the surface that is a signal incident surface of the optical disc. It is possible, however, also in this case to make an adjustment so as to minimize the spherical aberration by displacing the collimating lens 8 along its optical axis direction as depicted in this embodiment. Such an adjustment action using the displacement of the collimating lens 8 is performed by rotationally driving the aberration correcting motor 9.

By the above actions, the action of condensing the second laser beam onto the signal recording layer L2 included in the second optical disc D2 is performed. When such a condensing action is performed, a return beam reflected from the signal recording layer L2 enters the objective lens 11 from its second optical disc D2 side. The return beam incident on the objective lens 11 goes through the reflection mirror 10, the collimating lens 8, and the ¼ wave plate 7 into the half mirror 6. Since the return beam incident on the half mirror 6 is already converted into the linearly polarized light beam in the S-direction by the ¼ wave plate 7, the return beam is allowed to pass through the half mirror 6.

The return laser beam passing through the half mirror 6 enters into the sensor lens 12 as the control laser beam Lc, and astigmatism is caused in the beam by the action of the sensor lens 12. The control laser beam Lc having astigmatism caused by the sensor lens 12 is irradiated by the condensing action of the sensor lens 12 to the sensor portion such as the 4-split sensor disposed on the photodetector 13. As a result of the return beam being irradiated to the photodetector 13 in this manner, the action of generating the focus error signal is carried out by utilizing a change in the shape of a spot applied to the sensor portion assembled in the photodetector 13. The focusing control action can thus be performed by utilizing the focus error signal and displacing the objective lens 11 toward the signal surface of the second optical disc D2.

Although not described in this embodiment, the configuration is such that a tracking control action can be performed utilizing the plus-first-order beam and the minus-first-order beam generated by the second diffraction grating 4. By performing such a control action, the action of reading out signals recorded on the second optical disc D2 is performed.

Since it is possible to recognize whether the condensed spot formed by the condensing action of the objective lens 11 on the signal recording layer L2 of the second optical disc D2 is good or defective by detecting the magnitude of the level of a reproduction signal obtained from the photodetector 13, the aberration correcting motor 9 is rotationally driven based on this recognition signal to adjust the position of the collimating lens 8 in its optical direction, thereby enabling correction of the spherical aberration.

The read-out action of signals recorded on the first optical disc D1 and the second optical disc D2 by the optical pickup apparatus is performed as described hereinabove. Description will next be made of an action of reading out signals recorded on the third optical disc D3.

In the case of performing the action of reading out signals recorded on the third optical disc D3, a drive current is fed to the laser chip 3b assembled in the two-wavelength laser diode 3, and the two-wavelength laser diode 3 emits a third laser beam having a wavelength of 655 nm. The third laser beam emitted from the two-wavelength laser diode 3 enters the second diffraction grating 4, and is separated by the diffraction grating portion 4a making up the second diffraction grating 4 into a zeroth-order beam, a plus-first-order beam, and a minus-first-order beam, and is thereafter converted by the ½ wave plate 4b into a linearly polarized light beam in the P-direction. The third laser beam passing through the second diffraction grating 4 enters the polarized light beam splitter 5, and passes through the control film 5a disposed in the polarized light beam splitter 5.

The third laser beam passing through the control film 5a enters the half mirror 6. Since such a laser beam is a P-polarized light beam, it is reflected by the half mirror 6 toward the ¼ wave plate 7. The third laser beam incident on the ¼ wave plate 7 is converted into a circularly polarized light beam, and thereafter enters the collimating lens 8 and is converted into a parallel beam by the action of the collimating lens 8. The laser beam converted into the parallel beam by the collimating lens 8 is reflected by the reflection mirror 10 and thereafter enters the objective lens 11. The laser beam incident on the objective lens 11 is to be irradiated as a condensed spot onto the signal recording layer L3 of the third optical disc D3 by the condensing action of the objective lens 11.

When the above described third laser beam condensing action is performed by the objective lens 11, there occurs a spherical aberration due to the difference in the thickness of the protective layer lying between the signal recording layer L3 and the surface that is a signal incident surface of the optical disc. It is possible, however, also in this case to make an adjustment so as to minimize the spherical aberration by displacing the collimating lens 8 along its optical axis direction as depicted in this embodiment. Such an adjustment action using the displacement of the collimating lens 8 is performed by rotationally driving the aberration correcting motor 9.

By the above actions, the condensing action of the third laser beam onto the signal recording layer L3 included in the third optical disc D3 is performed. When such a condensing action is performed, a return beam reflected from the signal recording layer L3 enters the objective lens 11 from its third optical disc D3 side. The return beam incident on the objective lens 11 goes through the reflection mirror 10, the collimating lens 8, and the ¼ wave plate 7 and enters the half mirror 6. Since the return beam incident on the half mirror 6 is already converted into the linearly polarized light beam in the S-direction by the ¼ wave plate 7, the return beam is allowed to pass through the half mirror 6.

The return laser beam passing through the half mirror 6 enters into the sensor lens 12 as the control laser beam Lc, and astigmatism is caused in the beam by the action of the sensor lens 12. The control laser beam Lc having astigmatism caused by the sensor lens 12 is irradiated by the condensing action of the sensor lens 12 to the sensor portion such as the 4-split sensor disposed on the photodetector 13. As a result of the return beam being applied to the photodetector 13 in this manner, the action of generating the focus error signal is performed by utilizing a change in the shape of a spot irradiated to the sensor portion assembled in the photodetector 13. The focusing control action can thus be performed by utilizing the focus error signal and displacing the objective lens 11 toward the signal surface of the third optical disc D3.

Although not described in this embodiment, the configuration is such that a tracking control action can be performed utilizing the plus-first-order beam and the minus-first-order beam generated by the second diffraction grating 4. By performing such a control action, the action of reading out signals recorded on the third optical disc D3 is performed.

Since it is possible to recognize whether the condensed spot formed by the condensing action of the objective lens 11 on the signal recording layer L3 of the third optical disc D3 is good or defective by detecting the magnitude of the level of a reproduction signal obtained from the photodetector 13, the aberration correcting motor 9 is rotationally driven based on this recognition signal to adjust the position of the collimating lens 8 in its optical direction, thereby enabling correction of the spherical aberration.

Although as described hereinabove such as the actions of reading out signals recorded on each of the optical discs D1, D2, and D3 are performed by the optical pickup apparatus having the configuration depicted in FIG. 1, the following description will be made of actions of the objective lens 11 condensing the laser beams on each of the signal recording layers L1, L2, and L3 included in each of the optical discs D1, D2, and D3, which is the gist of this embodiment, with reference to FIGS. 2, 3 and 4.

Note that, in this embodiment, the first optical disc D1 is described as a Blu-ray standard optical disc, the second optical disc D2 is described as a CD standard optical disc, and the third optical disc D3 is described as a DVD standard optical disc.

In this embodiment, a spherical surface of the objective lens 11 is formed from an aspherical surface configured to condense the first laser beam on the signal recording layer L1 included in the first optical disc D1, and the incident surface on which the first laser beam emitted from the first laser diode 1 and the second laser beam and the third laser beam emitted from the two-wavelength laser diode 3 enter has three regions of an inner region, an intermediate region, and an outer region.

Here, the inner region disposed on the laser beam incident surface of the objective lens 11 is set to a region having a numerical aperture of up to 0.165, the intermediate region is set to a region having a numerical aperture of 0.165 to 0.615, and the outer region is set to a region having a numerical aperture of 0.615 to 0.85.

Although in this manner the incident surface of the objective lens 11 is configured by the above three regions of the inner region, the intermediate region, and the outer region, the intermediate region is formed with a diffraction zone (not shown). Such a diffraction zone is formed to have a sawtooth shape in section as described in, for example, Japanese Patent Application Laid-Open Publication No. 2006-107680.

Figure 2:
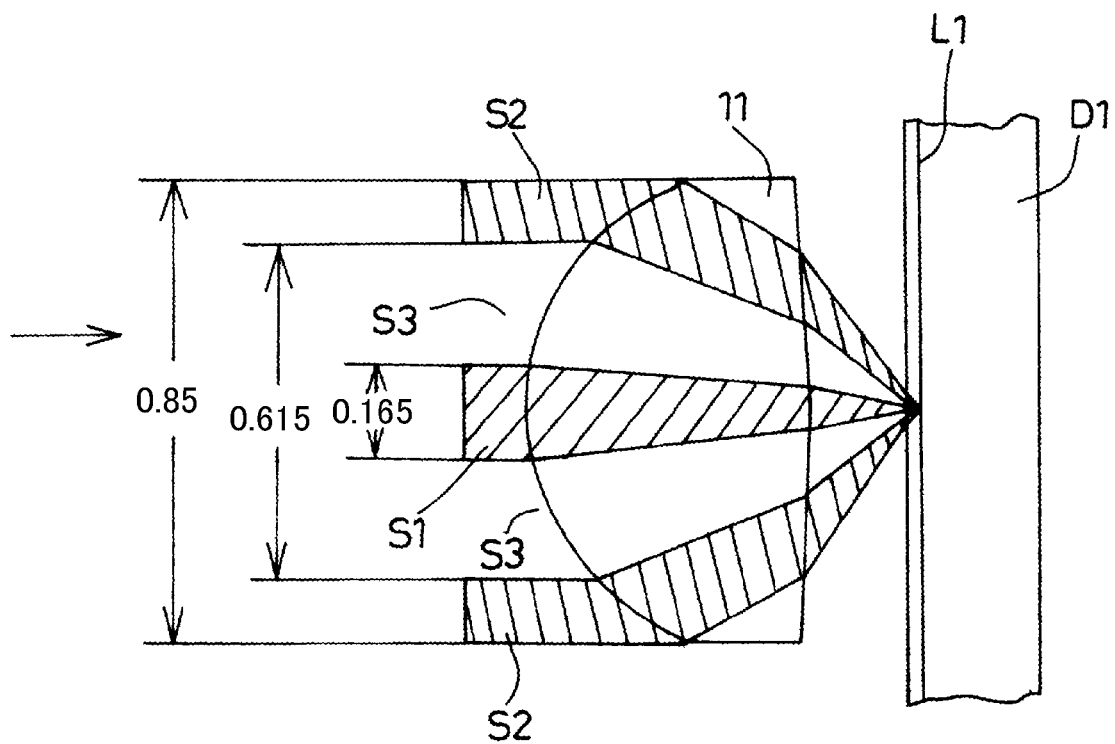
FIG. 2 is a diagram of a relationship between an objective lens assembled in the optical pickup apparatus according to this embodiment and an optical disc.
Figure 3:
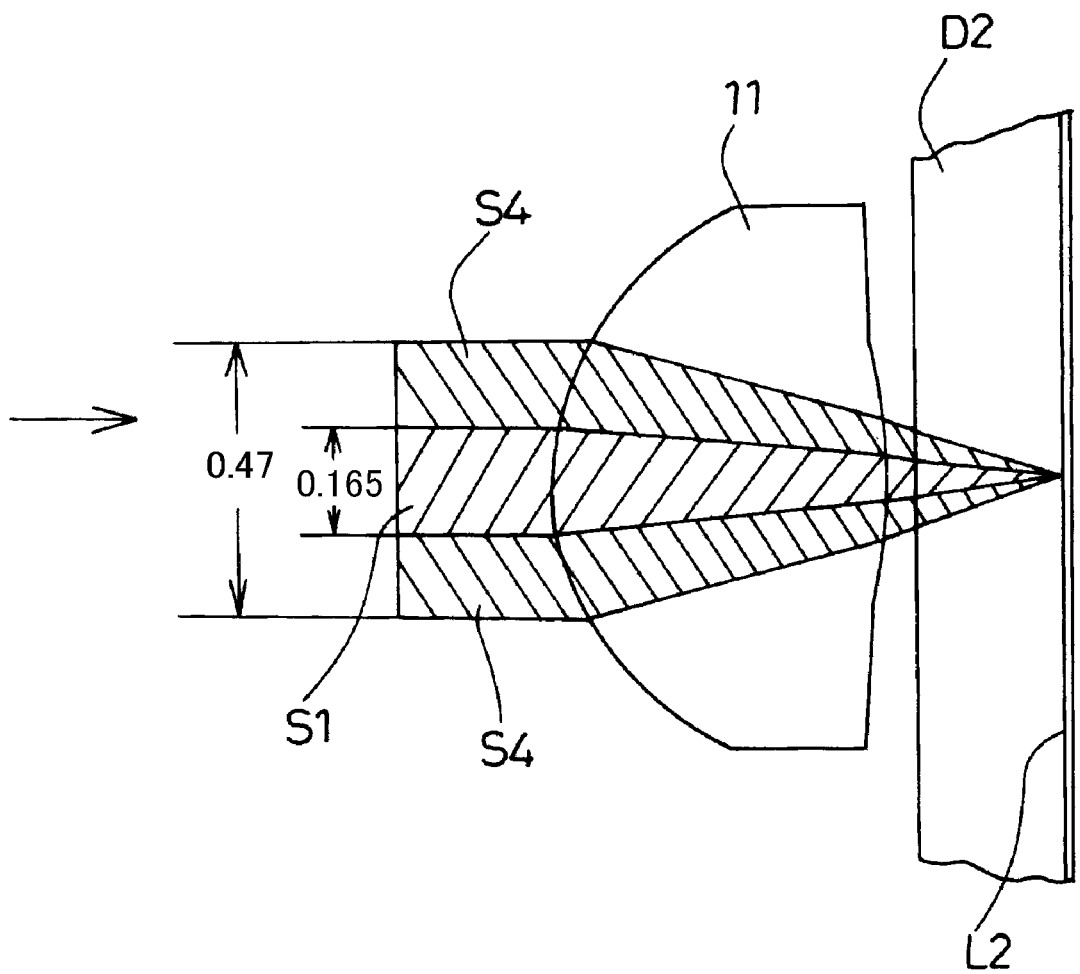
FIG. 3 is another diagram showing a relationship between the objective lens assembled in the optical pickup apparatus according to this embodiment and an optical disc.
Figure 4:
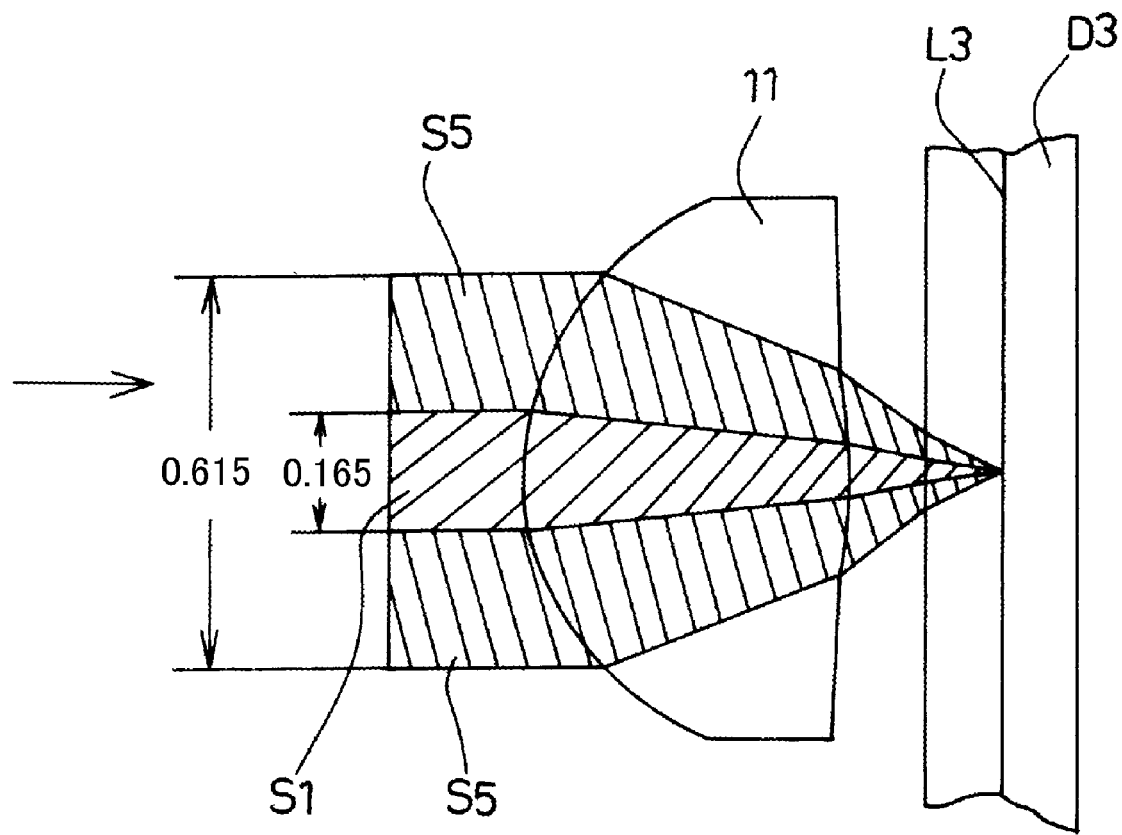
FIG. 4 is a further diagram showing a relationship between the objective lens assembled in the optical pickup apparatus according to this embodiment and an optical disc.

In such a configuration, the first laser beam emitted from the first laser diode 1, and the second laser beam and the third laser beam emitted from the two-wavelength laser diode 3 enter as, for example, parallel beams into the objective lens 11 from the direction of an arrow as depicted in FIGS. 2, 3 and 4.

FIG. 2 depicts a relationship among the first laser beam, the objective lens 11, and the first optical disc D1, in the case of using the first optical disc D1 that is a Blu-ray standard optical disc. A diffraction zone is formed in the intermediate region on the surface of the objective lens 11, the diffraction zone being designed so that the first laser beams of S1 and S2 portions shown by hatched lines are condensed on the signal recording layer L1 disposed in the first optical disc D1.

That is, the laser beams of the S1 and S2 portion shown by hatched lines is a zeroth-order diffracted beam of the first laser beam, and a first laser beam of an S3 portion shown as non-hatched is diffracted by the above described diffraction zone disposed in the intermediate region and is allowed to pass through the objective lens 11 as a second-order diffracted beam. The second-order diffracted beam of the first laser beam thus passing therethrough is scattered so as not to condense on the signal recording layer L1 and not to adversely affect the actions of reading out signals recorded on the signal recording layer L1.

In this manner, the action of condensing the first laser beam on the signal recording layer L1 of the first optical disc D1 is performed and the action of reading out signals recorded on the signal recording layer L1 is performed. In such a case, the numerical aperture is set to 0.85.

As described above in the case of using the first optical disc D1 that is the Blu-ray standard optical disc, the first laser beam having a wavelength of 405 nm emitted from the first laser diode 1 is used, and the numerical aperture of the objective lens 11 is set to 0.85, thereby making it possible to perform without any trouble the action of reading out the signals recorded on the signal recording layer L1 of the first optical disc D1.

FIG. 3 depicts a relationship among the second laser beam, the objective lens 11, and the second optical disc D2, in the case of using the second optical disc D2 that is a CD standard optical disc. A diffraction zone is formed in the intermediate region on the surface of the objective lens 11, the diffraction zone being designed so that the second laser beams of S1 and S4 portions shown by hatched lines are condensed on the signal recording layer L2 disposed in the second optical disc D2.

That is, the laser beam of the S1 portion shown by hatched lines is a zeroth-order diffracted beam of the second laser beam, and the laser beam of the S4 portion is a first-order diffracted beam that is diffracted by the diffraction zone disposed in the above-described intermediate region. The diffraction zone, having a numerical aperture of 0.47 to 0.615 in the intermediate region disposed on the outer peripheral side of the S4 portion shown by hatched lines, acts so as to perform the condensing action for the wavelength of the third laser beam which will be described later, but is set so as to scatter the beam for the wavelength of the second laser beam. The outer region does not act to condense the beam on the second signal recording layer L2 for the wavelength of the second laser beam, and as a result the second laser beams of the S1 and S4 portions shown by hatched lines become condensed on the second signal recording layer L2.

In this manner, the action of condensing the second laser beam on the signal recording layer L2 of the second optical disc D2 is performed to perform the signal read-out action. In such a case, the numerical aperture is set to 0.47.

As described above, in the case of using the second optical disc D2 that is the CD standard optical disc, the second laser beam having a wavelength of 785 nm emitted from the two-wavelength laser diode 3 is used and the numerical aperture of the objective lens 11 set to 0.47, thereby making it possible to perform without any trouble the action of reading out signals recorded on the signal recording layer L2 of the second optical disc D2.

FIG. 4 depicts a relationship among the third laser beam, the objective lens 11, and the third optical disc D3, in the case of using the third optical disc D3 that is a DVD standard optical disc. A diffraction zone is formed in the intermediate region on the surface of the objective lens 11, the diffraction zone being designed so that the third laser beam of S1 and S5 portions shown by hatched lines are condensed on the signal recording layer L3 provided in the third optical disc D3.

That is, the laser beam of the S1 portion shown by hatched lines is a zeroth-order diffracted beam of the third laser beam, and the laser beam of the S5 portion is a first-order diffracted beam that is diffracted by the diffraction zone provided in the above described intermediate region. The outer region disposed on the outer peripheral side of the S5 portion shown by hatched lines does not act to condense the beam on the third signal recording layer L3 for the wavelength of the third laser beam, and as a result the third laser beams of the S1 and S5 portions shown by hatched lines become condensed on the third signal recording layer L3.

In this manner, the action of condensing the third laser beam on the signal recording layer L3 of the third optical disc D3 is performed and the signal read-out action is performed. In such a case, the numerical aperture is set to 0.615.

As described above, in the case of using the third optical disc D3 that is the DVD standard optical disc, the third laser beam having a wavelength of 655 nm emitted from the two-wavelength laser diode 3 is used and the numerical aperture of the objective lens 11 is set to 0.615, thereby making it possible to perform without any trouble the action of reading out signals recorded on the signal recording layer L3 of the third optical disc D3.

Figure 5:
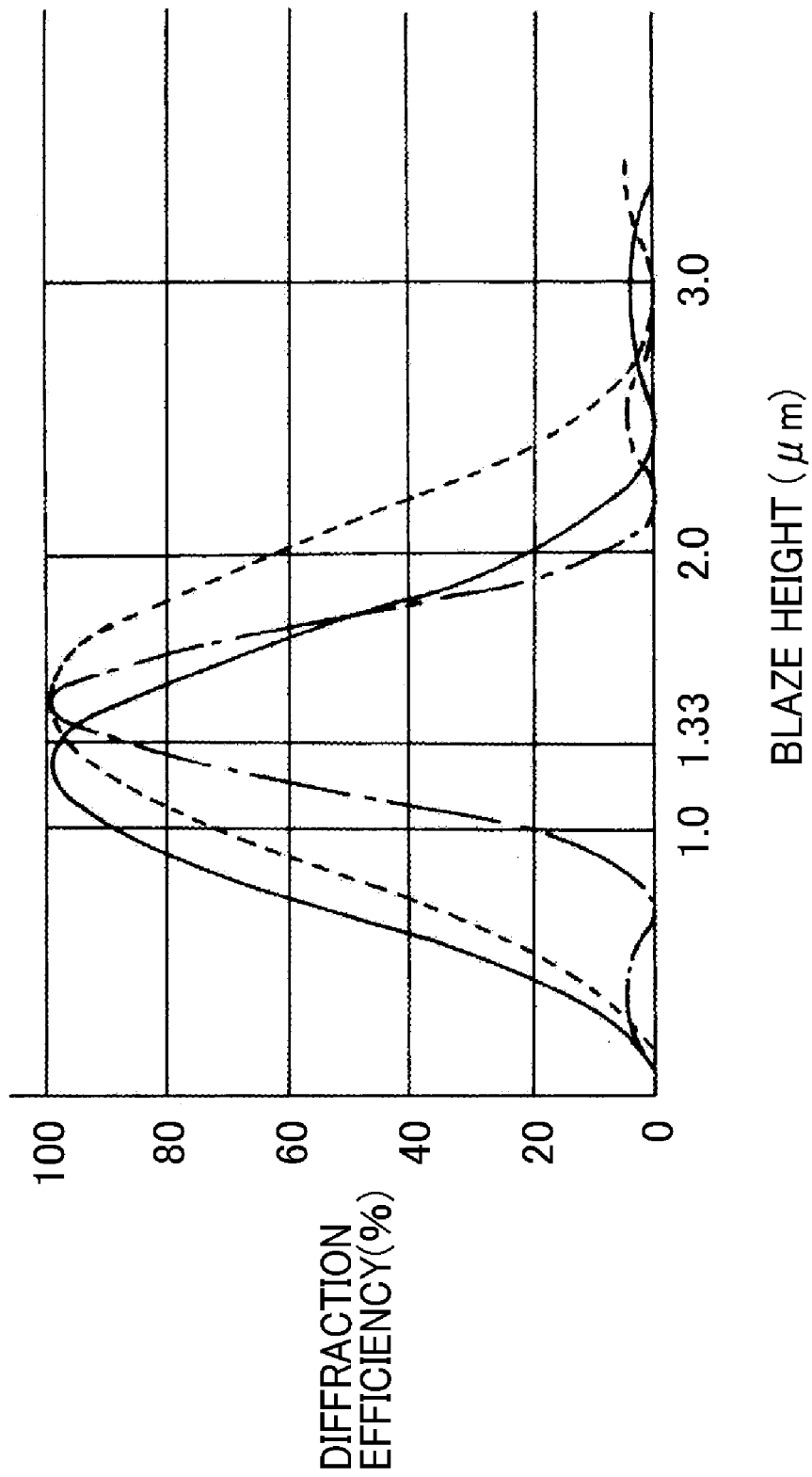
FIG. 5 is a diagram showing a relationship between a blaze height of a diffraction zone and a diffraction efficiency of a diffracted beam.

FIG. 5 depicts, for each of the laser beams, a relationship between a blaze height of the diffraction zone formed in the intermediate region on the surface of the objective lens 11 and diffraction efficiency. In FIG. 5, a solid-line curve represents a characteristic curve of the first-order diffracted beam of the third laser beam having a wavelength of 655 nm, a broken-line curve represents a characteristic curve of the first-order diffracted beam of the second laser beam having a wavelength of 785 nm, and a dashed-dotted-line curve represents a characteristic curve of the second-order diffracted beam of the first laser beam having a wavelength of 405 nm.

As is apparent from FIG. 5, in the case of setting to 1.33 μm the blaze height of the diffraction zone formed in the intermediate region of the incident surface of the objective lens 11, the diffraction efficiency of the second laser beam is 97.5%, the diffraction efficiency of the third laser beam is 97.3%, and the diffraction efficiency of the first laser beam is 92.0%. In this manner, there can be reduced the diffraction efficiency of the second-order diffracted beam of the first laser beam by the diffraction zone in the intermediate region, so that the diffraction angles of the zeroth-order diffracted beam and of the first-order diffracted beam can be changed to a great extent, and an adverse effect as a flare on the laser spot can be prevented.

In this embodiment, the spherical surface of the objective lens 11 is formed from an aspherical surface that condenses the first laser beam on the signal recording layer L1 included in the first optical disc D1. In the thus formed objective lens, up to the numerical aperture of 0.165, the zeroth-order beam of the second laser beam that performs the action of reading out the signals recorded on the second optical disc D2 that is the CD standard optical disc can be used, and up to the numerical aperture of 0.185, the zeroth-order beam of the third laser beam that performs the action of reading out signals recorded on the third optical disc D3 that is the DVD standard optical disc can be used, and hence the inner region is set to have a numerical aperture of up to 0.165.

Although description of this embodiment is made of a case where the second laser diode emitting the second laser beam and the third laser diode emitting the third laser beam are configured as a single two-wavelength laser diode, the second laser diode emitting the second laser beam and the third laser diode emitting the third laser beam may be provided separately. Instead of the two-wavelength laser diode, a three-wavelength laser diode can be employed that has a single casing that houses each of laser chips emitting the first laser beam, the second laser beam, and the third laser beam.

This embodiment is applicable to not only the optical pickup apparatus for reading out the signals recorded on the optical discs of the Blu-ray standard, the DVD standard, and the CD standard, but also to an optical pickup apparatus for other different standards.

The wavelength 405 nm of the laser beam shows a representative wavelength of the laser beam with a blue-violet wavelength suitable for the optical disc of the Blu-ray standard, and the wavelength 405 nm of the laser beam described in the embodiments is not limited to this wavelength and can be appropriately changed within a blue-violet wavelength range of the laser beam suitable for the optical disc of the Blu-ray standard. Further, the wavelength 655 nm of the laser beam shows a representative wavelength of the red wavelength laser beam suitable for the optical disc of the DVD standard, and the wavelength 655 nm of the laser beam described in the embodiments is not limited to this wavelength and can be appropriately changed within the red wavelength range of the laser beam suitable for the optical disc of the DVD standard. Further, the wavelength 785 nm of the laser beam shows a representative wavelength of the infrared wavelength laser beam suitable for the optical disc of the CD standard, and the wavelength 785 nm of the laser beam described in the embodiments is not limited to this wavelength and can be appropriately changed within the infrared wavelength range of the laser beam suitable for the optical disc of the CD standard.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus configured to read out a signal recorded on a signal recording layer of each of a first optical disc, a second optical disc, and a third optical disc, the first optical disc including a signal recording layer at a first distance from a surface thereof, the second optical disc including a signal recording layer at a second distance longer than the first distance from a surface thereof, the third optical disc including a signal recording layer at a third distance longer than the first distance and shorter than the second distance from a surface thereof, the optical pickup apparatus comprising:
   a first laser diode configured to generate a first laser beam having a first wavelength suitable for reading out a signal recorded on the signal recording layer of the first optical disc;
   a second laser diode configured to generate a second laser beam having a second wavelength suitable for reading out a signal recorded on the signal recording layer of the second optical disc, the second wavelength being longer than the first wavelength;
   a third laser diode configured to generate a third laser beam having a third wavelength suitable for reading out a signal recorded on the signal recording layer of the third optical disc, the third wavelength being longer than the first wavelength and shorter than the second wavelength; and
   an objective lens configured to condense the first to third laser beams on the signal recording layers of the first to third optical discs, respectively,
   an incident surface of the objective lens, on which each of the first to third laser beams is allowed to enter, having an inner region covering a center of the incident surface, an outer region, and an intermediate region between the inner and outer regions, a diffraction zone formed in the intermediate region,
   the first laser beam being condensed on the signal recording layer of the first optical disc by condensing actions of the inner region and the outer region, wherein the first laser beam incident on the intermediate region is diffracted by the diffraction zone so as to not be condensed on the signal recording layer of the first optical disc,
   the second laser beam being condensed on the signal recording layer of the second optical disc by condensing actions of the inner region and the intermediate region, wherein the second laser beam incident on the intermediate region is condensed on the signal recording layer of the second optical disc by being diffracted by the diffraction zone, the third laser beam being condensed on the signal recording layer of the third optical disc by condensing actions of the inner region and the intermediate region, wherein the third laser beam incident on the intermediate region is condensed on the signal recording layer of the third optical disc by being diffracted by the diffraction zone, wherein a blaze height of the diffraction zone is set so that a diffraction efficiency of the first laser beam is lower than diffraction efficiencies of the second and third laser beams.

2. The optical pickup apparatus of claim 1, wherein the objective lens is formed with an aspherical surface configured to condense the first laser beam on the signal recording layer of the first optical disc.

3. The optical pickup apparatus of claim 1, wherein the second laser diode is a laser chip configured to generate the second laser beam, and wherein the third laser diode is a laser chip configured to generate the third laser beam, and wherein the two laser chips are incorporated in the same casing to constitute a two-wavelength laser diode.

4. The optical pickup apparatus of claim 1, further comprising a collimating lens interposed in a common optical path between the objective lens and the first to third laser diodes, the collimating lens configured to correct a spherical aberration by displacements in an optical axis direction of the first to third laser beams.

* * * * *